(12) United States Patent
Suzuki et al.

(10) Patent No.: US 6,788,525 B2
(45) Date of Patent: Sep. 7, 2004

(54) POWDERED TANTALUM, NIOBIUM, PRODUCTION PROCESS THEREOF AND POROUS SINTERED BODY AND SOLID ELECTROLYTIC CAPACITOR USING THE POWDERED TANTALUM OR NIOBIUM

(75) Inventors: Ryosuke O. Suzuki, Kyoto (JP); Rieko Ishii, Kyoto (JP); Tadao Nishiyama, Kyoto (JP); Hitoshi Iijima, Fukushima (JP)

(73) Assignee: Cabot Supermetals K.K., Tokyo (JP)

( * ) Notice: Subject to any disclaimer, the term of this patent is extended or adjusted under 35 U.S.C. 154(b) by 0 days.

(21) Appl. No.: 10/431,653

(22) Filed: May 7, 2003

(65) Prior Publication Data

US 2003/0206390 A1 Nov. 6, 2003

Related U.S. Application Data

(63) Continuation of application No. 09/589,069, filed on Jun. 8, 2000, now Pat. No. 6,563,695.
(60) Provisional application No. 60/169,941, filed on Dec. 10, 1999.

(30) Foreign Application Priority Data

Nov. 16, 1999 (JP) ............................................. 11-326135
Dec. 14, 1999 (JP) ............................................. 11-355055

(51) Int. Cl.⁷ .............................................. H01G 9/045
(52) U.S. Cl. ...................... 361/529; 361/523; 361/525; 361/528; 361/508; 361/509
(58) Field of Search ................................. 361/529, 523, 361/528, 525, 503, 504, 508, 509, 512, 516, 433, 510, 272, 273

(56) References Cited

U.S. PATENT DOCUMENTS

| | | | |
|---|---|---|---|
| 4,231,790 A | 11/1980 | Hahn et al. | 75/0.5 |
| 4,234,557 A | 11/1980 | Arendt et al. | 423/593 |
| 4,502,884 A | 3/1985 | Fife | 75/0.5 |
| 4,684,399 A | 8/1987 | Bergman et al. | 75/0.5 |
| 5,284,531 A | 2/1994 | Fife | 148/513 |
| 5,324,603 A | 6/1994 | Jin et al. | 430/39 |
| 5,846,505 A | 12/1998 | Saegusa | 423/263 |
| 5,954,856 A | 9/1999 | Pathare et al. | 75/255 |
| 6,040,975 A | 3/2000 | Mimura | 361/523 |
| 6,136,062 A | 10/2000 | Loffelholz et al. | 75/369 |
| 6,165,623 A | 12/2000 | Fife et al. | 428/472 |
| 6,171,363 B1 | 1/2001 | Shekhter et al. | 75/369 |
| 6,563,695 B1 | 5/2003 | Suzuki et al. | 361/529 |

Primary Examiner—William H. Mayo, III
Assistant Examiner—Nguyen T. Ha
(74) Attorney, Agent, or Firm—Kilyk & Bowersox, P.L.L.C.

(57) ABSTRACT

A tantalum or niobium powder that can provide a porous sintered tantalum or niobium body having a large surface area and involving a lower risk of failure to form a solid electrolyte film, where a material serving as a tantalum or niobium ion source is dissolved in a molten salt, upon which a reducing agent is allowed to act, resulting in reduction to the metal state of the tantalum or niobium ions dissolved in the molten salt, to thereby obtain a tantalum or niobium powder including aggregated columnar particles. A tantalum or niobium powder contains radially aggregated particles formed by a plurality of columnar particles aggregated radially.

21 Claims, 5 Drawing Sheets

POWDERED TANTALUM, NIOBIUM, PRODUCTION PROCESS THEREOF AND POROUS SINTERED BODY AND SOLID ELECTROLYTIC CAPACITOR USING THE POWDERED TANTALUM OR NIOBIUM

CROSS REFERENCE TO RELATED APPLICATION

This application is a continuation of U.S. patent application Ser. No. 09/589,069 filed Jun. 8, 2000, now U.S. Pat. No. 6,563,695 B1, which claims benefit of U.S. Provisional Patent Application No. 60/169,941 filed Dec. 10, 1999.

FIELD OF THE INVENTION

The present invention relates to a tantalum or niobium powder that is useful as a material for a positive electrode to be incorporated into a solid electrolytic capacitor and to a process for producing the powder, and more particularly to a tantalum powder that can provide a positive electrode endowed with low equivalent series resistance (abbreviated as "ESR" hereinafter) and high capacitance.

BACKGROUND OF THE INVENTION

Conventionally, a positive electrode in a solid electrolytic capacitor is formed of a porous sintered tantalum or niobium body having a porosity of, for example, 70% by volume. Tantalum or niobium powder serving as a raw material for producing the porous sintered tantalum or niobium body is an agglomeration of particles assuming the form of a sponge containing a large number of quasi-spherical pores that communicate with one another. The agglomerated particles have a spherical shape with a particle diameter of several tens to several hundred $\mu$m.

Conventionally, tantalum powder is produced in the following manner, for example.

First, a primary powder is prepared by way of a known method such as reduction of potassium heptafluorotantalate by sodium or reduction of tantalum pentachloride by hydrogen. Then, the thus-obtained primary powder is subjected to washing with acid/water as needed, degassing, and heat treatment at a temperature at least 1000° C., followed by deoxidation treatment to remove excess oxygen, to thereby obtain a tantalum powder.

Subsequently, the thus-obtained tantalum powder is subjected to press working into a predetermined shape and then to sintering, to thereby obtain a positive electrode having a large number of pores derived from the pores contained in the agglomerated particles (i.e., tantalum powder).

Nobium primary powder is produced by the same process after the reduction of potassium heptafluoroniobate by sodium or reduction of niobium pentachloride by hydrogen. And a positive electrode can be obtained from press working and sintering the powder.

A solid electrolytic capacitor may be produced in the following manner, for example. On the surface of the porous sintered body (the positive electrode), a film of a solid electrolyte (hereinafter called a solid electrolyte film) is formed. Onto the film, a negative electrode formed of an Ni wire or a like material is bonded by soldering. The porous sintered body and the negative electrode are then covered integrally with a coating resin such as flame-resistant epoxy resin.

Conventionally, manganese oxide has predominantly been used as a solid electrolyte. A solid electrolyte film formed of manganese oxide may be produced in the following manner, for example. First, the porous sintered body is subjected to chemical forming through a customary method. Then, the porous sintered body is soaked in a solution of manganese nitrate and pyrolyzed, to thereby form a solid electrolyte film. Since the porous sintered body contains a large number of quasi-spherical pores communicating with one another as described above, when the porous sintered body is soaked in the solution of manganese nitrate, the solution permeates through the pores on the surface of the sintered body, reaching the pores inside the sintered body that communicate with the pores on the surface, and then to the pores on another portion of the surface of the sintered body. In this manner, the solution of manganese nitrate permeates the entirety of the porous sintered body. Accordingly, a solid electrolyte film having a large area is formed, enabling efficient use of the entire surface of the positive electrode.

Recently, as electronic apparatus and circuits have been down-sized and have high frequency, there is an increasing demand for solid electrolytic capacitors endowed with high capacitance and low ESR. The capacitance of a solid electrolytic capacitor increases with the surface area of the positive electrode present therein. Thus, the porous sintered tantalum body preferably has high porosity, to thereby produce a solid electrolytic capacitor endowed with high capacitance.

Also, when the positive electrode present in a solid electrolytic capacitor assembled into a CPU or power circuit of a personal computer has an increased ESR, a failure may occur in signal processing with high-speed operation in the electronic circuits. Thus, ESR is an important characteristic.

The primary cause for an increase in ESR of the positive electrode is a failure to form a solid electrolyte film.

However, an increase in porosity of tantalum or niobium powder in order to produce a porous sintered body of higher porosity may deteriorate the strength of the tantalum or niobium powder, causing crushing of pores during press working and resulting in decreased porosity of the porous sintered body. Thus, the porosity of tantalum or niobium powder must be adjusted to a level that endows the tantalum or niobium powder with appropriate strength.

Also, a failure to form a solid electrolyte film is predominantly caused by the heterogeneity of the pores contained in the porous sintered body.

Figure 7:
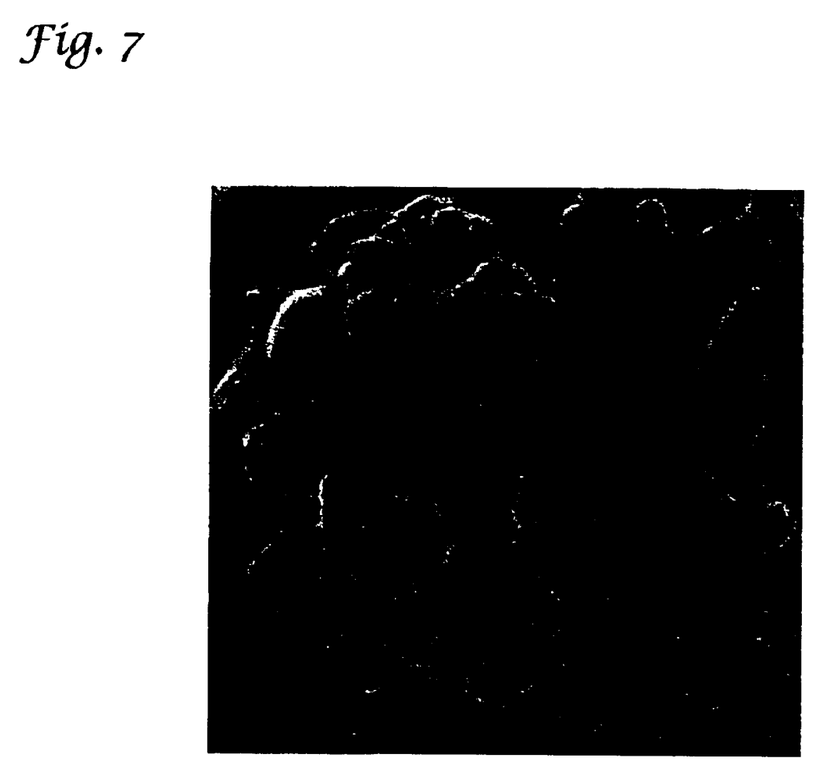
FIG. 7 is a microphotograph obtained by use of an SEM, showing an example of a porous sintered tantalum body formed of a conventional tantalum powder.

Accordingly, when the pores inside the porous sintered body do not communicate with the pores on the surface of the porous sintered body; i.e., when the pores inside the sintered body are closed and independent, the solution of manganese nitrate does not permeate these closed pores, resulting in a failure to form a solid electrolyte film. Also, when a pore inside the sintered body communicates with one pore on the surface of the sintered body but not to any other pore on another part of the surface of the sintered body, pot-shaped pores having a bottom are formed. The solution of manganese nitrate does not sufficiently permeate such a pore, resulting in a failure to form a solid electrolyte film. FIG. 7 is a microphotograph obtained by use of a scanning electron microscope (SEM) showing a porous sintered tantalum body produced from conventional tantalum powder and containing closed pores and pot-shaped pores.

Generation of the closed pores and pot-shaped pores depends on factors such as the particle size distribution of the powder, the crushing resistance of pores present in the powder during press working (ease of compaction), and the state and fraction of pores inside the powder.

Recently, a new technique that utilizes conductive polymers instead of manganese oxide has been put into practical use. Since conductive polymers are of large molecular size, they encounter difficulty in permeating the pores present in the porous sintered body. Thus, more precise control over the pores present in the porous sintered body is required.

SUMMARY OF THE INVENTION

The present invention has been attained in view of the foregoing, and an object of the present invention is to obtain a tantalum or niobium powder that can provide a porous sintered body having a large surface area and a lower risk of failure in forming a solid electrolyte film.

More specifically, an object of the present invention is to provide a tantalum or niobium powder having homogeneous pores and endowed with appropriate strength.

Still more specifically, an object of the present invention is to provide a technique that can reduce the risk of producing closed pores and pot-shaped pores.

The present inventors have found that a tantalum or niobium powder in the form of columnar particles can be obtained through a specific production process, thus leading to completion of the present invention.

Accordingly, in order to solve the above-mentioned drawbacks, the present invention provides the following.

A first embodiment is directed toward providing a tantalum or niobium powder comprising aggregated columnar particles.

A second embodiment is directed toward providing a tantalum powder according to the first embodiment, wherein the powder contains radially aggregated particles formed by aggregating a plurality of columnar particles radially.

A third embodiment is directed toward providing a tantalum powder according to the first or second embodiment, wherein the powder is obtained by reduction of a tantalate salt without allowing the tantalate salt to come into direct contact with a reducing agent. And the embodiment is also directed toward providing a niobium powder according to the first embodiment, wherein the powder is obtained by reduction of a niobate salt without allowing the niobate salt to come into direct contact with a reducing agent.

A fourth embodiment is directed toward providing a tantalum or niobium powder according to the third embodiment, wherein the reducing agent comprises magnesium or sodium.

A fifth embodiment is directed toward providing a process for producing a tantalum or niobium powder, wherein the tantalum or niobium powder is obtained by reduction of a tantalate or niobate salt without allowing the tantalate or niobate salt to come into direct contact with a reducing agent.

A sixth embodiment is directed toward providing a process for producing a tantalum or niobium powder according to the fifth embodiment, wherein the reducing agent comprises magnesium or sodium.

A seventh embodiment is directed toward providing a porous sintered tantalum or niobium body formed of a tantalum or niobium powder as recited in any one of the first through fourth embodiments.

An eighth embodiment is directed toward providing a solid electrolytic capacitor, which contains a positive electrode formed of a porous sintered tantalum or niobium body as recited in the seventh invention.

DETAILED DESCRIPTION OF THE INVENTION

The tantalum powder according to the present invention may, for example, be obtained through a production process comprising the following steps.

1. A material serving as a tantalum ion source is dissolved in a molten salt (a medium).

2. A reducing agent is allowed to act upon the molten salt. Accordingly, the reducing agent reduces the tantalum ions dissolved in the molten salt to the metal state, causing the crystallization and precipitation of a tantalum powder in the molten salt. By-products formed during reduction are dissolved in the molten salt, and thus the activity of the by-products is suppressed, leading to excellent reactivity. Also, the tantalum powder is surrounded by the molten salt, to thereby reduce the risk of an increase in particle size of the powders caused by collision and aggregation. Thus, powders of a relatively small size can be obtained, advantageously resulting in a larger surface area.

3. The tantalum powder is recovered from the molten salt.

4. Ions derived from a reducing agent present in the molten salt are recovered and subjected to electrolysis or a like process for recycling as a reducing agent.

The niobium powder is obtained using the same method only by changing the tantalum material to niobium material.

Conventionally, a tantalate or niobate salt and a reducing agent have been allowed to come into direct contact with each other, such as being mixed. However, as described above, the method in which a tantalate or niobate is reduced without being allowed to come into direct contact with a reducing agent refers to the following steps of: dissolving a tantalate or niobate salt in a medium (a molten salt); allowing a liquefied or vaporized reducing agent to act upon the medium; and reducing the tantalate or niobate salt contained in the medium by way of the medium.

In the present invention, examples of suitable raw materials include potassium heptafluorotantalate and sodium heptafluorotantalate, which have conventionally been used in the tantalum metal refining industry. In addition, halides of tantalum such as tantalum pentachloride, tantalum pentafluoride, and tantalum pentaiodide may also be used by suitably selecting the amount to be used in accordance with solubility in the molten salt.

As a raw material of niobium, potassium heptafluoroniobate, sodium heptafluoroniobate can be used, or halides of niobium such as niobium pentachloride, niobium pentafluoride and niobium pentaiodide may also be used by selecting the amount to be used by suitably selecting the amount to be used in accordance with solubility in the molten salt.

Examples of reducing agents include alkali metals such as sodium and potassium, and alkaline earth metals such as calcium and magnesium, which can thermodynamically reduce tantalum or niobium ions to the metal state. Preferred reducing agents are those which satisfy the following conditions:

(1) The reducing agent is soluble in the molten salt.
(2) The reducing agent and tantalum (or niobium) are not soluble in each other.
(3) Salts such as chlorides, fluorides, and iodides of the reducing agents which are by-products of the reaction, are soluble in the molten salt.
(4) There is a large difference in specific gravity between the reducing agent and the molten salt.
(5) After completion of reaction, only the by-products of the reducing agent may be recycled through electrolysis.
(6) The reducing agent is inexpensive and is abundantly available as a resource.

Examples of reducing agents that satisfy the above conditions include sodium and magnesium. Magnesium is preferred because it can easily be reclaimed industrially.

Molten salts preferably satisfy the following conditions:

(1) The molten salt is thermochemically stable against a reducing agent and tantalum (or niobium) powder, and serves as a medium for chemical reaction.
(2) Since the molten salt is used at high temperature, it is endowed with characteristics such as low vapor pressure and low volatility.
(3) The molten salt is inexpensive and is abundantly available as a resource.
(4) The molten salt has a low melting point, in view of energy conservation.
(5) In order to prevent contamination by impurities, when the material is, for example, a chloride, the molten salt is also preferably a chloride.

Examples of preferred molten salts which satisfy the above conditions and which are stable against a reducing agent include alkali metal salts and alkaline earth metal salts. Anions constituting the salt are preferably selected in accordance with the condition of material as described in (5). In consideration of separation and recovery of anions and tantalum (or niobium), as well as recycling of the reducing agent after reaction is completed, an alkali metal chloride and an alkaline earth metal chloride are preferred.

The present invention is illustrated in greater detail by reference to the following. Unless otherwise indicated, all parts, percents, ratios and the like are by weight.

EXAMPLES

The tantalum or niobium powder of the present invention will next be described by way of a tantalum example.

First Example

Figure 1:
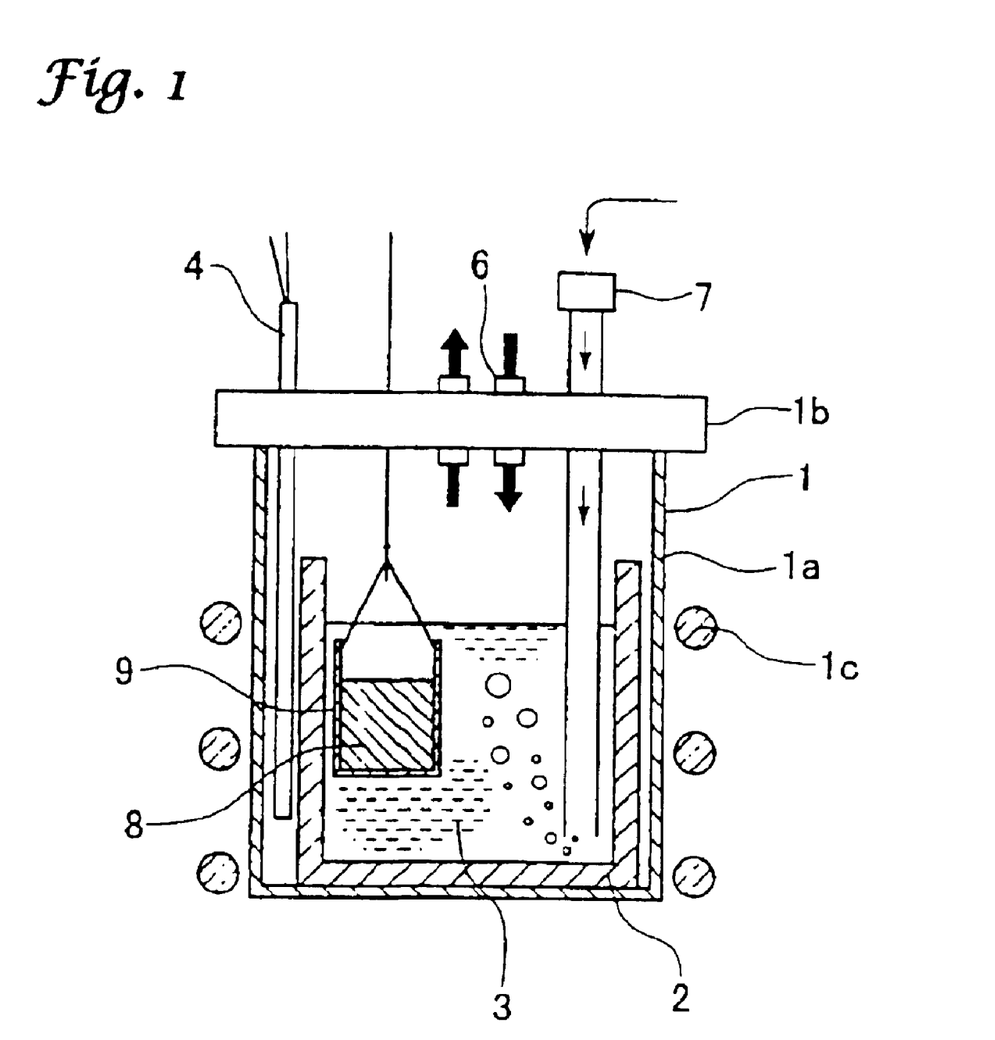
FIG. 1 is an illustrative view of an apparatus used in a production process of a tantalum or niobium powder according to a first embodiment of the present invention.

FIG. 1 shows an illustrative view of an apparatus used in a production process of a tantalum powder according to a first Example. Reference numeral 1 in FIG. 1 represents a container 1 formed of a material such as dense mullite or stainless steel. The container 1 comprises a main body 1a and a lid 1b. The main body 1a has a hollow columnar shape with an open top and a closed bottom. A heater 1c is provided to surround the main body 1a.

A thermometer 4 and a pipe (a lance) 7 are provided through the lid 1b for insertion into the container 1. The pipe 7, which will be described in detail below, is maintained closed until the start of formation of a molten salt.

Gas flow tubes 6 are also provided through the lid 1b to substitute an atmosphere in the container 1 or evacuate the interior of the container 1.

A crucible 2 is formed of dense alumina ($Al_2O_3$) or of magnesium oxide and has a hollow columnar shape with an open top and a closed bottom. The crucible 2 is loaded with a salt before melting and placed in the main body 1a. The salt used in this example has a eutectic composition of KCl—NaCl and is used in an amount of 200 g. The crucible 2 has an internal diameter of 42 mm$\phi$ and a height of 155 mm.

Subsequently, the heater 1c is turned on and the interior of the container 1 is evacuated by way of the gas flow tubes 6. Then, the salt is subjected to vacuum drying for 1–24 hours at room temperature to 600° C. The conditions applied in this example are a temperature of 200° C. and a duration of 2 hours. By subjecting the salt to vacuum drying, the molten salt is endowed with higher stability, and the resultant tantalum powder is prevented from being oxidized by oxygen generated from water contained in the molten salt.

Subsequently, the interior atmosphere of the container 1 is substituted by an inert gas such as argon gas or nitrogen gas introduced through the gas flow tubes 6, and then the temperature is elevated to from 660 to 1000° C. and maintained there for from 0 to 2 hours, to thereby bring the salt contained in the container 1 to the molten state (molten salt 3). In the present example, the temperature is elevated to approximately 900° C. and maintained thereat for 0.5 hours.

A crucible 9 containing a reducing agent 8 is lowered into the molten salt 3 and maintained for 0.5 to 12 hours at from 660 to 1000° C. In the present example, the temperature is maintained for 0.5 hours at approximately 900° C. The wall of the crucible 9 contains a plurality of pores that enable a gas or liquid to flow into or out of the crucible 9.

The material for the crucible 9 is selected in view of thermodynamic stability and chemical reactivity to the reducing agent.

In the present example, since magnesium serves as a reducing agent, magnesium oxide is selected as the material for the crucible 9, because of its thermodynamic stability to magnesium.

In this case, however, according to the thermodynamic chemical potential of oxygen as compared with magnesium and magnesium oxide, oxygen diffuses into the molten salt 3. Consequently, the tantalum powder containing oxygen is obtained. In cases where oxygen contamination is undesirable, a material that does not exhibit chemical reactivity to a reducing agent is preferably selected for the crucible 9. When magnesium is used as the reducing agent, iron is suitably selected as the material.

Subsequently, while the pipe 7 is inserted downward through the lid 1b into the molten salt 3 and the temperature of the molten salt 3 is maintained at from 900 to 950° C., a material vaporized by heating is supplied to the molten salt 3 through the pipe 7. Since the temperature of the molten salt 3 is generally higher than the boiling point of the material, particles of the reducing agent in solid state at room temperature may be fed into the pipe 7 along with an inert gas such as argon gas or nitrogen gas, to thereby be vaporized and supplied into the molten salt 3. The material used in this example is tantalum pentachloride, which has a boiling point of approximately 240° C. Thus, the tantalum pentachloride is vaporized as soon as it is fed into the molten salt 3 maintained at approximately 900° C.

Thus, chemical reaction between the reducing agent and material contained in the molten salt 3 proceeds. In the present example, magnesium oxide is selected as the material for the pipe 7, for the same reason it is selected as the material for the crucible 9.

Then, the crucible 9 and the pipe 7 are lifted up out of the molten salt 3, to thereby cool.

Subsequently, the molten salt 3 is washed with water flow and an acid such as acetic acid and then recovered, to thereby obtain a mixture of water and tantalum powder. The tantalum powder contained in the mixture is separated from the water by centrifugation, filtration, or a like process, and then dried, to thereby recover the tantalum powder.

The shape and size of the particles forming the tantalum powder may be specified by an analysis such as elemental analysis by energy dispersive X-ray spectroscopy (EDX), phase identification by means of a powder X-ray diffraction apparatus, or shape analysis by use of a scanning electron microscope (SEM).

Second Example

A production process of a tantalum powder of a second example comprises a first step and a second step. In the first step, a salt mixture formed of the molten salt containing tantalum ions is produced. In the second step, a reducing agent is allowed to act upon the salt mixture, to thereby obtain a tantalum powder. The reducing agent, molten salt, and material used in second example are the same as those used in the first example.

Figure 2:
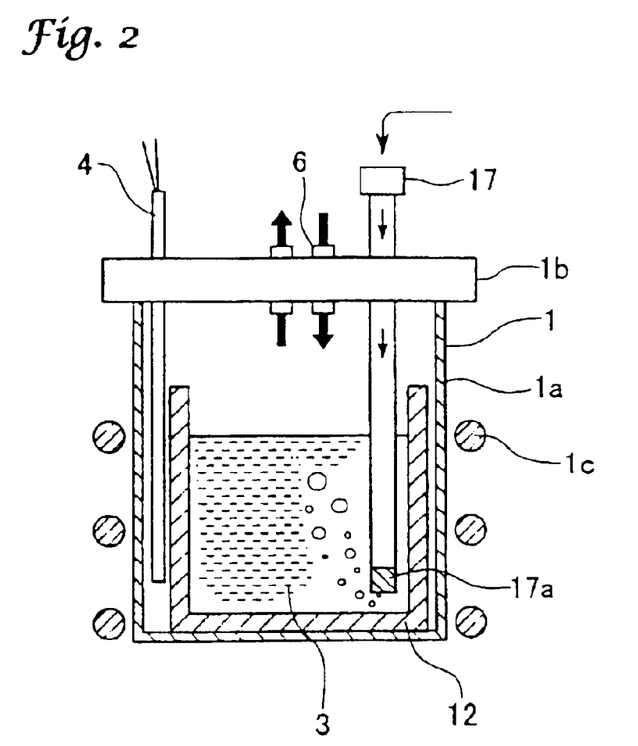
FIG. 2 is an illustrative view of an apparatus used in a first step of a production process of a tantalum powder according to a second embodiment of the present invention.

FIG. 2 shows a schematic view of an apparatus used in the first step. The same elements as in FIG. 1 are denoted by the same reference numerals, and their descriptions are omitted. In the second example, a crucible 12 is formed of dense magnesium oxide. A tip of a pipe 17 for supplying a material is covered with a tantalum foil 17a, through which a vaporized material is supplied, to thereby cause disproportionation.

First, the pipe 17 is placed so as to supply a material into the container 1 at a temperature of from 850 to 950° C. (900° C. in the present example), to thereby dissolve the material in the molten salt. Then, the pipe 17 is removed, allowing the molten salt to cool, to thereby obtain a salt mixture formed of the molten salt containing tantalum ions derived from the material.

Figure 3:
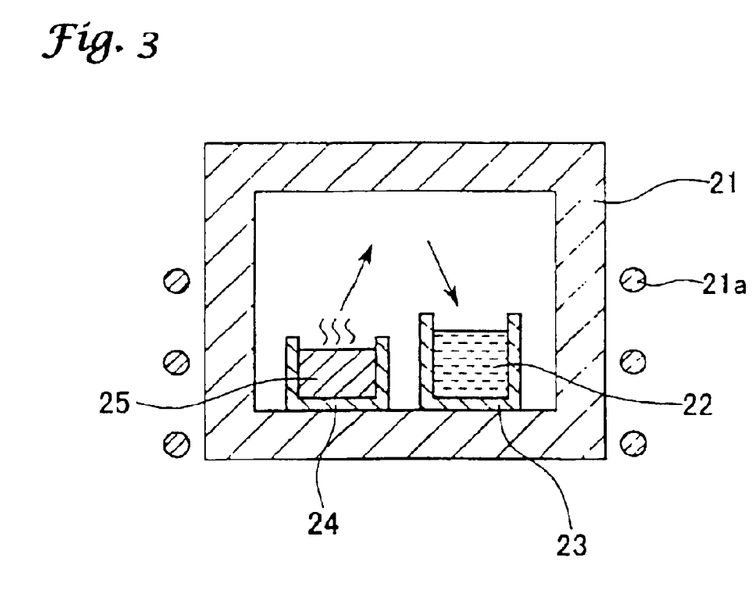
FIG. 3 is an illustrative view of an apparatus used in a second step of the production process of a tantalum powder according to the second embodiment of the present invention.

FIG. 3 shows a schematic view of an apparatus used in the second step. A salt mixture 22 obtained as described above (30 g in the present example) is placed in a crucible 23. The crucible 23 is then placed in a sealed container 21 formed of stainless steel or a like material. A heater 21a is provided to surround the sealed container 21. The crucible 23 used in the present example is formed of alumina.

Also, a reducing agent 25 contained in a crucible 24 is placed in the sealed container 21. In the present example, a preferred material for the crucible 24 is magnesium oxide or iron, in consideration of thermodynamic stability to magnesium, the reducing agent 25. The material for the crucible 24 used in the present example is magnesium oxide.

The interior of the sealed container 21 is evacuated by use of a decompression pump or a like apparatus, and then the atmosphere in the container is substituted with an inert gas such as argon gas or nitrogen gas in order to prevent loss of the reducing agent due to oxidation. The temperature is elevated to from 850 to 950° C. and maintained thereat for from 1 to 6 hours. In the present example, the temperature is elevated to 900° C. and maintained thereat for 3 hours.

Then, the reducing agent 25 present in the crucible 24 is vaporized. The vaporized reducing agent fills the entire atmosphere of the sealed container 21 and is allowed to act upon the salt mixture 22 present in the crucible 23, to thereby generate tantalum powder within the salt mixture 22.

Subsequently, the salt mixture 22 is washed with water and an acid such as acetic acid, and then recovered. Then, the same procedure as described in the first Example is performed so as to obtain a tantalum powder.

Figure 4:
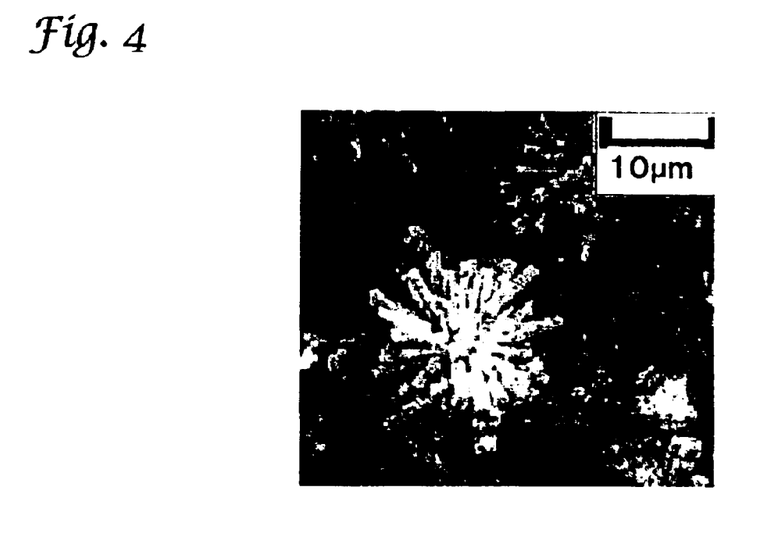
FIG. 4 is a photograph of an example of a tantalum powder according to the present invention obtained by use of SEM.

FIG. 4 shows a photograph of an example of the tantalum powder according to the present invention obtained by use of SEM.

A plurality of particles having the shape of a quadrangular pole are formed, and about ten to one thousand of these columnar particles are further aggregated radially to thereby form radially aggregated particles.

In the tantalum powder according to the present invention, the length of a columnar particle is from 2 to 20 $\mu$m, and the length of a side of the quadrangle, which is a cross-section perpendicular to the longitudinal direction of the columnar particle, is from 0.1 to 2 $\mu$m. The ratio of a side of the quadrangle to the length of a columnar particle is within the range of from 1/2 to 1/100, preferably from 1/5 to 1/30. When the ratio is in excess of 1/2, the ratio of the columnar particle is not significantly different from the ratio of a conventional spherical particle; whereas when the ratio is lower than 1/100, the columnar particle is likely to have deteriorated strength.

The average particle diameter of the radially aggregated particles is from 0.2 to 10 $\mu$m, preferably from 0.35 $\mu$m. When the diameter is smaller than 0.2 $\mu$m, the particles are difficult to handle, whereas when the diameter is larger than 10 $\mu$m, the obtained tantalum powder disadvantageously has a small surface area.

Figure 5:
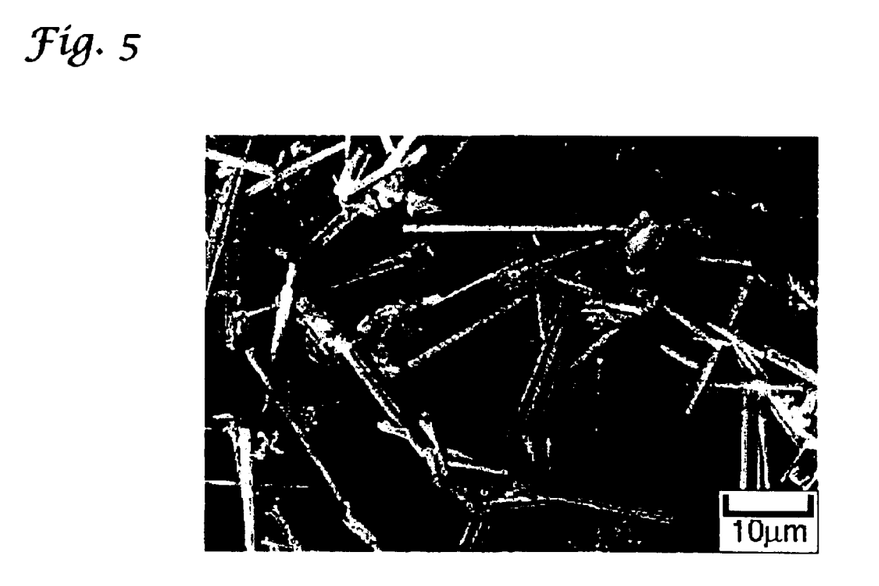
FIG. 5 is a photograph of an example of a niobium powder according to the present invention obtained by use of SEM.

FIG. 5 shows a SEM photograph of an example of the niobium powder according to the same apparatus and method supplying niobium pentachloride into the melting salt at 850° C., using magnesium as the reducing agent. And a plurality of particles having the shape of a quadrangular pole are formed.

In the niobium powder according to the present invention, the length of a columnar particle is from 0.3 to 100 $\mu$m, and the length of a side of the quadrangle, which is a cross-section perpendicular to the longitudinal direction of the columnar particle, is from 0.3 to 2 $\mu$m. The ratio of a side of the quadrangle to the length of a columnar particle is within the range of from 1/2 to 1/100, preferably from 1/5 to 1/30. When the ratio is in excess of 1/2, the ratio of the columnar particle is not significantly different from the ratio of a conventional spherical particle; whereas when the ratio is lower than 1/100, the columnar particle is likely to have deteriorated strength.

When a porous sintered body is produced by the method of the invention from the tantalum or niobium powder formed of columnar particles, the pores present in the porous sintered body are formed by a plurality of columnar particles intersecting one another. Thus, the porous sintered body contains pores that are not easily crushed during press working, and is endowed with a large surface area and appropriate strength. Moreover, the risk of generation of closed or pot-shaped pores is low, leading to low risk of a failure to form a solid electrolyte film.

In addition, when a tantalum powder containing radially aggregated particles is used, pores are always formed between adjacent particles, to thereby improve these effects.

Figure 6:
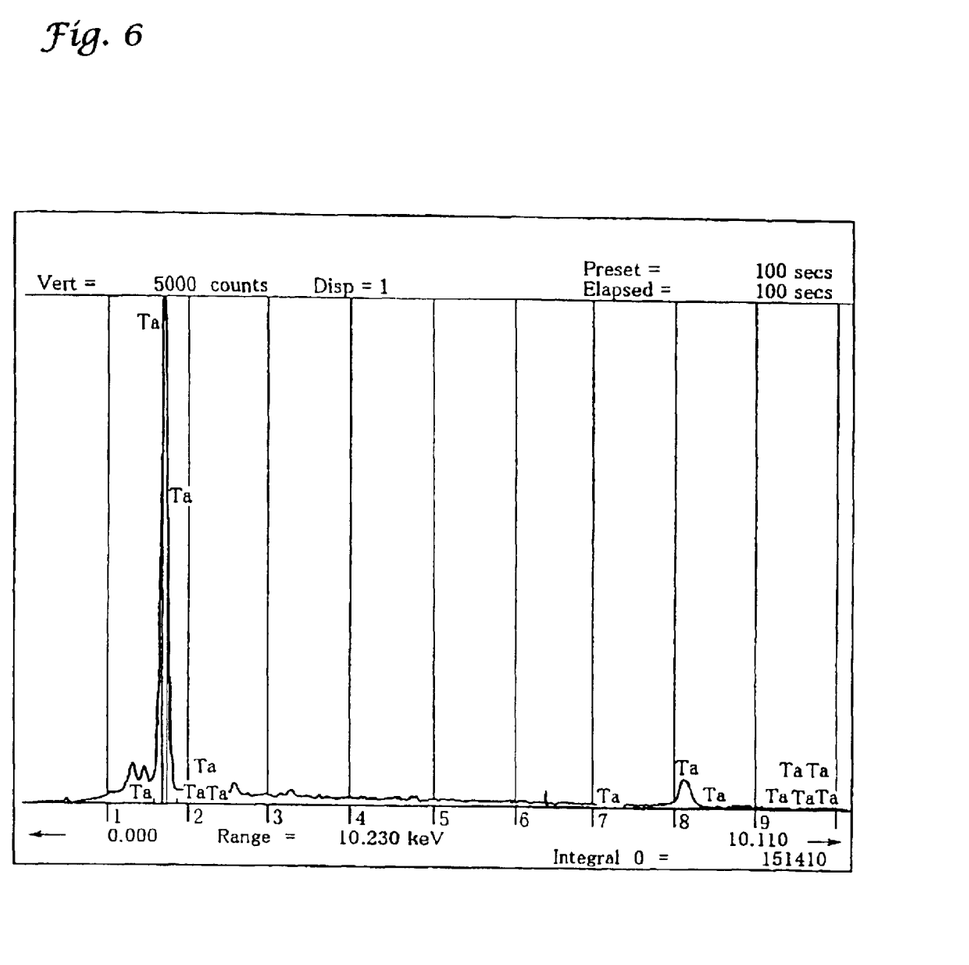
FIG. 6 is a chart showing the results of the composition identification by X-rays (EDX) of an example of a tantalum powder according to the present invention.

FIG. 6 is a chart showing the results of the compositional identification by X-rays (EDX) of an example tantalum powder according to the present invention.

The X-axis of the chart indicates the energy of the X-rays in the unit of keV, with the left end representing 0.000 keV and the right end representing 10.110 keV. The X-ray peaks of tantalum, which are known, are marked with the symbol Ta.

The Y-axis of the chart indicates the strength of the X-rays in the unit of count number in 100 seconds, with the lower end representing 0 and the upper end representing 5000. The count number of the highest peak exceeds 5000.

The chart shows that tantalum was strongly detected. Aluminum attributable to the material for a crucible or the like was detected in a small amount as an impurity.

A solid electrolytic capacitor containing the tantalum or niobium powder of the present invention may be produced in the following manner. From the tantalum or niobium powder, a porous sintered body is produced through a conventional method as described above. On the surface of the porous sintered body (a positive electrode), a solid electrolyte film produced from, for example, manganese oxide is formed. Onto the film, a negative electrode formed of an Ni wire or a like material is bonded by soldering. The porous sintered body and the negative electrode are then covered integrally with coating resin such as fire-resistant epoxy resin.

As described above, by use of the tantalum or niobium powder of the present invention, a porous sintered body endowed with appropriate strength and high porosity can be obtained. Accordingly, a solid electrolytic capacitor of high capacitance can be obtained.

Also, the porous sintered body has a low risk of generation of closed or pot-shaped pores. Thus, the risk of failure to form a solid electrolyte film is low, and increase in ESR of the solid electrolytic capacitor can be prevented.

While the invention has been described in detail and with reference to specific embodiments thereof, it will be apparent to one skilled in the art that various changes and modifications can be made therein without departing from the spirit and scope therein.

What is claimed is:

1. A tantalum powder comprising radially aggregated columnar particles.

2. A tantalum powder according to claim 1, wherein said coumnar particles are formed by radial aggregates.

3. A porous sintered tantalum body formed of the tantalum powder as claimed in any one of claims 1 to 2.

4. A solid electrolytic capacitor, which comprises a positive electrode formed of the porous sintered tantalum body as claimed in claim 3.

5. A tantalum powder according to claim 1 or 2, wherein the powder is obtained by reduction of a tantalate salt without allowing the tantalate salt to come into direct contact with a reducing agent.

6. A tantalum powder according to claim 5, wherein the reducing agent comprises magnesium or sodium.

7. A porous sintered tantalum body formed of the tantalum powder as claimed in claim 6.

8. A solid electrolytic capacitor, which comprises a positive electrode formed of the porous sintered niobium body as claimed in claim 7.

9. A porous sintered tantalum body formed of the tantalum powder as claimed in claim 5.

10. A solid electrolytic capacitor, which comprises a positive electrode formed of the porous sintered tantalum body as claimed in claim 9.

11. A process for producing a tantalum powder of claim 1, wherein the tantalum powder is obtained by reduction of a tantalate salt without allowing the tantalate salt to come into direct contact with a reducing agent.

12. A process for producing a tantalum powder according to claim 11, wherein the reducing agent comprises magnesium or sodium.

13. A niobium powder comprising radially aggregated columnar particles, wherein the length of the columnar particles is from about 0.3 to about 100 μm.

14. A niobium powder according to claim 13, wherein the powder is obtained by reduction of a niobate salt without allowing the niobate salt to come into direct contact with a reducing agent.

15. A niobium powder according to claim 14, wherein the reducing agent comprises magnesium or sodium.

16. A porous sintered niobium body formed of the niobium powder as claimed in claim 15.

17. A porous sintered niobium body formed of the niobium powder as claimed in claim 14.

18. A process for producing the niobium powder of claim 13, wherein the niobium powder is obtained by reduction of a niobate salt without allowing the niobate salt to come into direct contact with a reducing agent.

19. A process for producing a niobium powder according to claim 18, wherein the reducing agent comprises magnesium or sodium.

20. A porous sintered niobium body formed of the niobium powder as claimed in claim 13.

21. A solid electrolytic capacitor, which comprises a positive electrode formed of the porous sintered niobium body as claimed in any one of claims 20, 17 or 16.

* * * * *